US011995054B2

(12) United States Patent
Daruna et al.

(10) Patent No.: US 11,995,054 B2
(45) Date of Patent: *May 28, 2024

(54) MACHINE-LEARNING BASED DATA ENTRY DUPLICATION DETECTION AND MITIGATION AND METHODS THEREOF

(71) Applicant: Capital One Services, LLC, McLean, VA (US)

(72) Inventors: Srinivasarao Daruna, Ashburn, VA (US); Vijay Sahebgouda Bantanur, Gaithersburg, MD (US); Marisa Lee, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,569

(22) Filed: Sep. 2, 2022

(65) Prior Publication Data

US 2022/0414074 A1    Dec. 29, 2022

Related U.S. Application Data

(63) Continuation of application No. 17/139,128, filed on Dec. 31, 2020, now Pat. No. 11,436,206.

(51) Int. Cl.
| | |
|---|---|
| G06F 16/00 | (2019.01) |
| G06F 3/0481 | (2022.01) |
| G06F 16/215 | (2019.01) |
| G06F 16/23 | (2019.01) |
| G06F 18/22 | (2023.01) |
| G06F 18/243 | (2023.01) |
| G06N 20/00 | (2019.01) |

(52) U.S. Cl.
CPC ......... *G06F 16/215* (2019.01); *G06F 3/0481* (2013.01); *G06F 16/2322* (2019.01); *G06F 18/22* (2023.01); *G06F 18/24323* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 7,428,509 B2 | 9/2008 | Klebanoff | |
| 8,065,233 B2 | 11/2011 | Lee et al. | |
| 11,620,558 B1 * | 4/2023 | Xu | G06Q 30/0641 706/12 |

(Continued)

*Primary Examiner* — Bai D Vu
(74) *Attorney, Agent, or Firm* — Greenberg Traurig, LLP

(57) ABSTRACT

Systems and methods of the present disclosure enable a processor to automatically detect duplicate data entries by receiving data entries associated with a user, where each data entry includes a value, a time, an entity identifier, and a location. Pairs of similar data entries are determined by matching the entity identifier and the location pairs data entries. Candidate duplicate data entries are determined based on a proximity in time between data entries of the similar data entries. For each candidate duplicate data entry, a feature vector is generated including the entity identifier, location, value and time, and each feature vector is submitted to a duplicate classification model to automatically determine duplicate data entries from the candidate duplicate data entries, the duplicate classification model being trained according to a historical dispute entries.

16 Claims, 9 Drawing Sheets

(56) References Cited

U.S. PATENT DOCUMENTS

| | | | |
|---|---|---|---|
| 2015/0281788 A1* | 10/2015 | Noguerol | H04N 21/4753 |
| | | | 725/30 |
| 2018/0330378 A1 | 11/2018 | Fredinburg et al. | |
| 2019/0362317 A1 | 11/2019 | Rogynskyy et al. | |
| 2019/0378228 A1* | 12/2019 | Tucker | G06Q 20/10 |
| 2020/0007565 A1* | 1/2020 | Gonzales, Jr. | H04L 63/1416 |
| 2022/0004567 A1* | 1/2022 | Tao | G06F 16/215 |

\* cited by examiner

MACHINE-LEARNING BASED DATA ENTRY DUPLICATION DETECTION AND MITIGATION AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for machine-learning based data entry duplication detection and automated mitigation of data entry duplication and methods thereof.

BACKGROUND OF TECHNOLOGY

Many scenarios of data entries in databases include unintended or intentionally malicious duplication of data entries. In databases with large datasets, the detection of these duplicate data entries can present large hurdles in terms of efficiency and speed of detection. Such efficiency and speed considerations are important for database and processor efficiency, electronic resource management and security of data.

SUMMARY OF DESCRIBED SUBJECT MATTER

In some embodiments, the present disclosure provides an exemplary technically improved computer-based method that includes at least the following steps of receiving, by at least one processor, a plurality of data entries associated with a user, where each data entry of the plurality of data entries includes: i) an electronic activity value indicative of an amount of the electronic activity, ii) an electronic activity time value indicative of a date and time of the electronic activity, iii) an entity identifier identifying an entity associated with each data entry, and iv) a location identifier identifying a location associated with the electronic activity; determining, by the at least one processor, a plurality of similar data entries in the plurality of data entries based on a matching of the entity identifier and the location identifier between the similar data entries; determining, by the at least one processor, a plurality of candidate duplicate data entries of the plurality of similar data entries, based on a electronic activity proximity between each electronic activity time values of each candidate duplicate data entry of the plurality of candidate duplicate data entries; generating, by the at least one processor, for each candidate duplicate data entry, a feature vector including the entity identifier, the entity location identifier, the electronic activity value and the electronic activity time value; submitting, by the at least one processor, each feature vector for each candidate duplicate data entry to a duplicate classification model to automatically determine at least one duplicate data entry from the plurality of candidate duplicate data entries of the plurality of similar data entries, where the duplicate classification model includes model parameters trained according to a plurality of historical data entries and a plurality of historical dispute entries disputing past data entries; generating, by the at least one processor, a duplicate graphical user interface (GUI) including an alert message and a one-click dispute interface element, where the alert message represents the duplicate classification of an incorrect duplicate data entry; and where the one-click dispute interface element includes a user selectable element that upon selection causes an electronic request to dispute the at least one duplicate data entry to automatically issue and file at least one electronic activity dispute; and causing to display, by the at least one processor, the duplicate GUI on a user computing device associated with a user of the at least one duplicate data entry.

In some embodiments, the present disclosure provides another exemplary technically improved computer-based system that includes at least the following components of at least one processor in communication with at least one computer readable storage medium having software instructions stored thereon. The at least one processor is configured to execute the software instructions, that when executed, cause the at least one processor to perform steps to: receive a plurality of data entries associated with a user, where each data entry of the plurality of data entries includes: i) an electronic activity value indicative of an amount of the electronic activity, ii) an electronic activity time value indicative of a date and time of the electronic activity, iii) an entity identifier identifying an entity associated with each data entry, and iv) a location identifier identifying a location associated with the electronic activity; determine a plurality of similar data entries in the plurality of data entries based on a matching of the entity identifier and the location identifier between the similar data entries; determine a plurality of candidate duplicate data entries of the plurality of similar data entries, based on a electronic activity proximity between each electronic activity time values of each candidate duplicate data entry of the plurality of candidate duplicate data entries; generate for each candidate duplicate data entry, a feature vector including the entity identifier, the entity location identifier, the electronic activity value and the electronic activity time value; submit each feature vector for each candidate duplicate data entry to a duplicate classification model to automatically determine at least one duplicate data entry from the plurality of candidate duplicate data entries of the plurality of similar data entries, where the duplicate classification model includes model parameters trained according to a plurality of historical data entries and a plurality of historical dispute entries disputing past data entries; generate a duplicate graphical user interface (GUI) including an alert message and a one-click dispute interface element, where the alert message represents the duplicate classification of an incorrect duplicate data entry; and where the one-click dispute interface element includes a user selectable element that upon selection causes an electronic request to dispute the at least one duplicate data entry to automatically issue and file at least one electronic activity dispute; and cause to display the duplicate GUI on a user computing device associated with a user of the at least one duplicate data entry.

In some embodiments, the present disclosure provides the exemplary technically improved computer-based systems and methods that further include In some embodiments, the present disclosure provides the exemplary technically improved computer-based systems and methods that further include determining, by the at least one processor, a group key for each data entry of the plurality of data entries; and determining, by the at least one processor, the matching of the entity identifier and the location identifier between the similar data entries based on the group key of each similar data entry of the similar data entries matching.

In some embodiments, the present disclosure provides the exemplary technically improved computer-based systems and methods that further include where the alert is communicated prior to a posting of the at least one duplicate electronic activity.

In some embodiments, the present disclosure provides the exemplary technically improved computer-based systems and methods that further include where the duplicate classification includes a binary classification for each candidate duplicate data entry of the plurality of candidate duplicate data entries.

In some embodiments, the present disclosure provides the exemplary technically improved computer-based systems and methods that further include receiving, by the at least one processor, a plurality of new data entries associated with at least one other new user; determining, by the at least one processor, a plurality of similar new data entries in the plurality of new data entries based on a matching of the entity identifier and the location identifier between the similar new data entries; determining, by the at least one processor, a plurality of candidate duplicate new data entries of the plurality of similar new data entries, based on a new electronic activity proximity between each new electronic activity time values of each potentially incorrect new data entry of the potentially incorrect new data entries; generating, by the at least one processor, for each candidate duplicate new data entry, a new feature vector including a new entity identifier, a new entity location identifier, a new electronic activity value and a new electronic activity time value; and submitting, by the at least one processor, each new feature vector for each candidate duplicate new data entry to a duplicate classification model to automatically determine at least one duplicate new electronic activity from the plurality of candidate duplicate new data entries of the plurality of similar new data entries.

In some embodiments, the present disclosure provides the exemplary technically improved computer-based systems and methods that further include where the duplicate classification model includes a random forest model.

In some embodiments, the present disclosure provides the exemplary technically improved computer-based systems and methods that further include where the plurality of historical data entries and the plurality of historical dispute entries includes historical data entries and historical dispute entries from a rolling time period preceding the data entry.

In some embodiments, the present disclosure provides the exemplary technically improved computer-based systems and methods that further include where the rolling time period includes three months preceding the data entry.

In some embodiments, the present disclosure provides the exemplary technically improved computer-based systems and methods that further include where the duplicate classification model is retrained according to a predetermined schedule.

In some embodiments, the present disclosure provides the exemplary technically improved computer-based systems and methods that further include where the predetermined schedule includes once per week.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
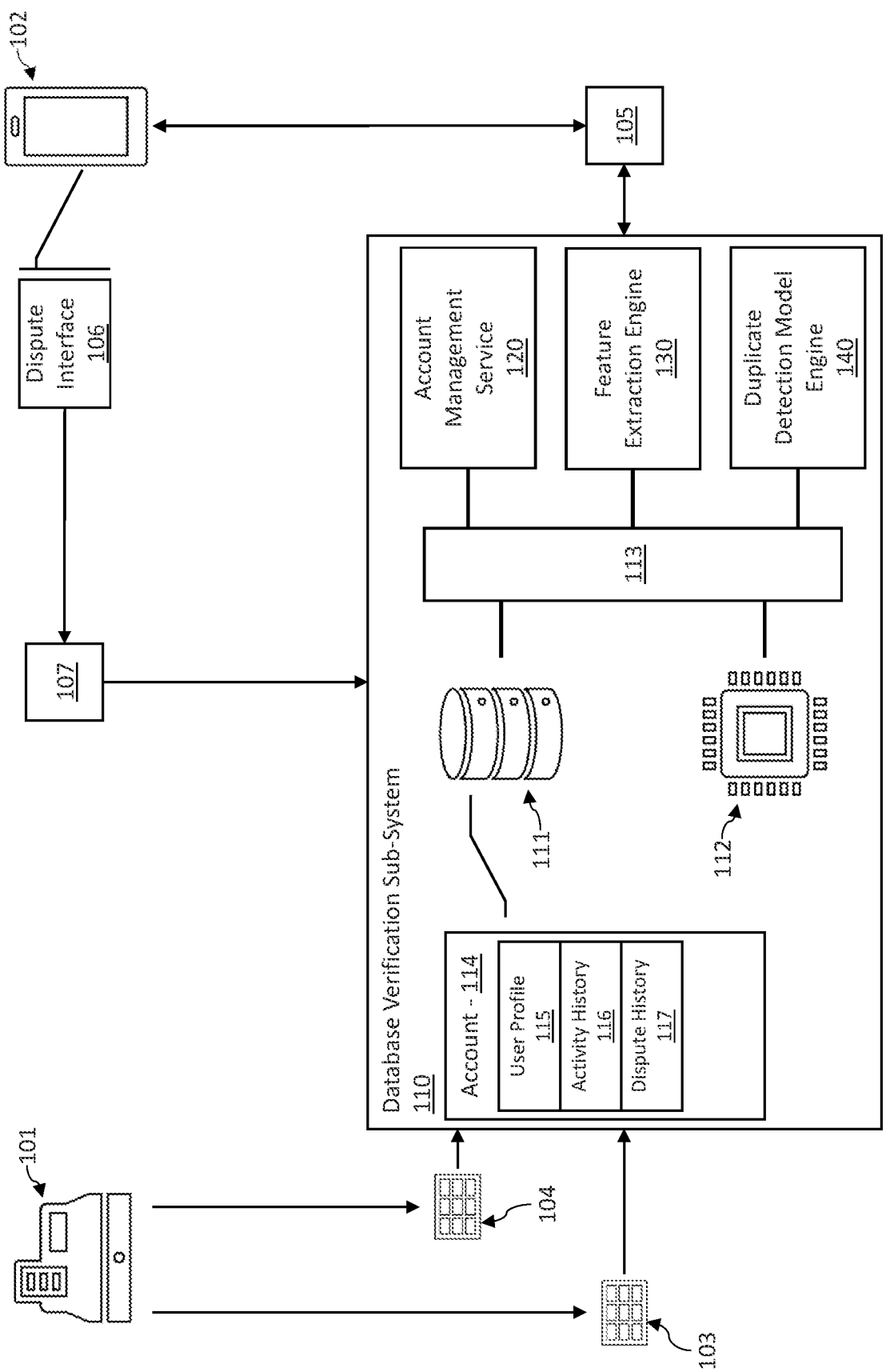
FIGS. 1-7 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of duplicate data entry detection for unintentional or malicious duplication of data entries in databases and other storage solutions. The following embodiments provide technical solutions and technical improvements that overcome technical problems, drawbacks and/or deficiencies in the technical fields involving database management, computational resource management and data security. As explained in more detail, below, technical solutions and technical improvements herein include aspects of improved machine learning models for data entry analysis to automatically and efficiently detect duplicate data entries with automated capabilities to mitigate the duplicate data entries to prevent fraudulent, malicious, erroneous and other harmful effects on data integrity and security while also reducing dataset size for more efficient resource management of computational resources. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of an exemplary computer-based system for the automated detection of duplicated data entries based on historical detected duplicate data entries in accordance with one or more embodiments of the present disclosure.

In some embodiments, a database verification sub-system 110 may receive data entries for electronic activities from activity execution devices, such as the electronic activity execution device 101. In some embodiments, the electronic activity execution device 101 may include any computing device from electronic activities are performed or executed, such as, e.g., a terminal, personal computer or mobile computing device for performing Internet-based and application-based activities (e.g., account logins, account information changes, online purchases, instant message communications, social media posts, among others and combinations thereof).

In some embodiments, the electronic activity execution device 101 may include a physical terminal for performing electronic transactions, such as, e.g., a point-of-sale device, automated teller machine (ATM) or other device. As a result of a user executing electronic activities via the electronic activity execution device 101, data entries may be produced for entry into the user's account 114. For example, the electronic activity execution device 101 may produce a first electronic activity data entry 103 and a second electronic activity data entry 104.

In some cases, these two data entries may be related to two separate electronic activities. However, in some embodiments, there are instances where the electronic activity execution device 101 may produce the first electronic activity data entry 103 and the second electronic activity data entry 104 for the same electronic activity, thus duplicating the data entries for the single electronic activity. Such a duplication requires additional communication resources, processing resource, database resources, as well as doubling the effect on the user's account 114, often to the detriment of the user. Thus, such duplicate data entries pose a technical problem for computation efficiency of account management and database management systems, as well as a threat to account security and data integrity. Accordingly, the database verification sub-system 110 is employed to monitor electronic activity data entries from the electronic activity execution device 101, as well as additional electronic activity execution devices to detect a duplicate data entry in user accounts and automatically mitigate the duplication.

In some embodiments, the database verification sub-system 110 may be a part of the electronic activity execution device 101. Thus, the database verification sub-system 110 may include hardware and software components including, e.g., electronic activity execution device 101 hardware and software, cloud or server hardware and software, or a combination thereof.

In some embodiments, the database verification sub-system 110 may include hardware components such as a processor 112, which may include local or remote processing components. In some embodiments, the processor 112 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 112 may include data-processing capacity provided by the microprocessor. In some embodiments, the microprocessor may include memory, processing, interface resources, controllers, and counters. In some embodiments, the microprocessor may also include one or more programs stored in memory.

Similarly, the database verification sub-system 110 may include storage 111, such as local hard-drive, solid-state drive, flash drive, database or other local storage, or remote storage such as a server, mainframe, database or cloud provided storage solution. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

Herein, the term "database" refers to an organized collection of data, stored, accessed or both, electronically from a computer system. In some embodiments, the term "database" may include a database model formed by one or more formal design and modeling techniques. In some embodiments, the term "database model" may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the term "database" may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

In some embodiments, the database verification sub-system 110 may implement computer engines for extracting data attributes and/or characteristics of the first electronic activity data entry 103 and the second electronic activity data entry 104 to predict with a machine learning model whether the first electronic activity data entry 103 and the second electronic activity data entry 104 are duplicative as a result of, e.g., unintentional, malicious, fraudulent or other cause of duplicate data entries to the user's account 114. Accordingly, in some embodiments, the computer engines of the present disclosure may include an account management service 120 to manage and utilize account histories of the user, a feature extraction engine 130 to extract the attributes and/or characteristics, and a duplicate detection model engine 140 to analyze the extracted attributes and/or characteristics based on training according to account histories. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to determine the errors, the database verification sub-system 110 may include computer engines including, e.g., the account management service 120, the feature extraction engine 130 and the duplicate detection model engine 140. In some embodiments, the account management service 120 may receive the first electronic activity data entry 103 and identify an associated user account 114, e.g., stored in the storage 111. In some embodiments, the account management service 120 may extract a plurality of data items from the first electronic activity data entry 103 including, e.g., but not limited to, at least a plurality of a user identifier associated with the first electronic activity data entry 103, a third-party entity identifier associated with the first electronic activity data entry 103, an activity type identifier, an activity value or activity quantity, a time data item, a location data item, a date data item, a device type or device identifier associated with the electronic activity execution device 101, an activity description, or other similarly suitable data items representing characteristics of the first electronic activity data entry 103.

For example, in some embodiments, the first electronic activity data entry 103 may include a transaction-related activity, such as a transaction record. In such an example, the data items may include, e.g., a transaction value, an account identifier or a user identifier or both, a merchant identifier, a transaction type, among other transaction data.

In some embodiments, the account management service 120 may similarly receive the second electronic activity data entry 104 and identify an associated user account 114, e.g., stored in the storage 111, such as the same account 114 as the first electronic activity data entry 103. In some embodiments, the account management service 120 may extract data items from the second electronic activity data entry 104 including, e.g., a user identifier associated with the second electronic activity data entry 104, a third-party entity identifier associated with the second electronic activity data entry 104, an activity type identifier, an activity value or activity quantity, a time data item, a location data item, a date data item, a device type or device identifier associated with the electronic activity execution device 101, an activity description, or other data items representing characteristics of the second electronic activity data entry 104.

In some embodiments, data of the second electronic activity data entry 104 is received after the data of the first electronic activity data entry 103. Accordingly, by the time the second electronic activity data entry 104 is received, the first electronic activity data entry 103 is a data entry in the activity history 116 of the user's account 114. Accordingly, to determine with the later received second electronic activity data entry 104 is a duplicate of the earlier received first electronic activity data entry 103, the account management service 120 may utilized the activity history 116 to identify and match the first electronic activity data entry 103 to the second electronic activity data entry 104. In some embodiments, the account management service 120 may perform the matching in real-time upon receiving the second electronic activity data entry 104, or according to a predetermined period during which the database verification sub-system 110 checks for duplicate data items in the account 114.

In some embodiments, to match the first electronic activity data entry 103, the second electronic activity data entry 104 or both to account 114, the account management service 120 may compare the user identifier or account identifier to user identifiers or account identifiers of accounts 114 in the storage 111. Using, e.g., an index or database query or other method of searching the storage 111, the account management service 120 may access the associated account 114 to access electronic activity records for the user, including, e.g., a user profile 115, an activity history 116 and a dispute history 117. In some embodiments, the activity history 116 may include data entries for electronic activities associated with the account. The dispute history 117 may include records of user disputes of data entries in the activity history 116.

Accordingly, in some embodiments, the account management service 120 may receive both the first electronic activity data entry 103 and the second electronic activity data entry 104 for recordation in the activity history 116 of the account 114. In some embodiments, recording both the first electronic activity data entry 103 and the second electronic activity data entry 104 enables comparison of both in order to determine duplicate submission for one electronic activity at the electronic activity execution device 101.

In some embodiments, the account management service 120 may address data entry duplication by testing data entries for duplication in the account 114. For example, upon receiving the second electronic activity data entry 104, the account management service 120 may check the second electronic activity data entry 104 against each data entry entered into the activity history 116 of the account 114. In some embodiments, the account management service 120 may test each data entry for a same or similar set of attributes as the second electronic activity data entry 104. For example, the account management service 120 may compare, e.g., a user identifier associated with each data entry, a third-party entity identifier associated with each data entry, an activity type identifier, an activity value or activity quantity, a time data item, a location data item, a date data item, a device type or device identifier associated with the electronic activity execution device 101, an activity description, or other attributes representing characteristics of each data entry.

In some embodiments, to facilitate efficient matching, the account management service 120 may restrict the matching operation to only data entries having a time data item indicating a time of execution within an electronic activity proximity defined by a predetermined interval around the time data item indicating the time of execution of the second electronic activity data entry 104. Because duplicate data entries are generally duplicated in a short amount of time, the electronic activity proximity may correspond to the short amount of time to capture the most likely time period within which the second electronic activity data entry 104 would be duplicated. Such an electronic activity proximity may include a time interval within, e.g., about one minute to five minutes, about five to ten minutes, about ten to fifteen minutes, about fifteen to twenty minutes, or any combination thereof.

In some embodiments, duplicate data entries are often issued by a same electronic activity execution device 101. Accordingly, the account management service 120 may filter data entries in the activity history 116 may, e.g., device identifier, device type identifier, location identifier or a combination thereof associated with each data entry in the activity history 116. The filtering can be configured to have, e.g., a device identifier, device type, location or combination thereof within a predetermined similarity to the device identifier, device type and location of the second electronic activity data entry 104. In some embodiments, the predetermined similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify the electronic activity execution device 101 as the same device between any two data entries.

In some embodiments, similarity may be measured between each of the device identifier, device type identifier and location identify separately, and the respective similarity scores summed, averaged, or otherwise combined. In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of the device identifier, device type identifier and location identify. The group key may be produced by creating a single string, list, or value from combining each of, e.g., a string, list or value representing each of the device identifier, device type identifier and location identifier into a single data item. The similarity between each data entry and the second electronic activity data entry 104 may then be measured as the similarity between the associated hashes and/or group keys. The measured similarity may then be compared against the predetermined similarity score to determine candidate data entries for matches to the second electronic activity data entry 104.

In some embodiments, through any combination of the filtering and similarity measurement described above, the account management service 120 may identify each data entry in the activity history 116 that is a candidate duplicate data entry of the second electronic activity data entry 104, including, for example the earlier received first electronic activity data entry 103, among other possible candidate duplicate data entries. While there may be any number of candidate duplicate data entries, for ease of illustration, the following description uses the first electronic activity data entry 103 as an example of a candidate duplicate data entry of the second electronic activity data entry 104. The detection of a duplication and mitigation thereof as described with respect to the first electronic activity data entry 103 would be similar for any identified candidate duplicate data entry.

In order to implement the account management service 120, the account management service 120 may be implemented as one or more computer engines that may include software components, hardware components, or a combination thereof. For example, each computer engine may include a dedicated processor and storage. However, in some embodiments, the computer engines share hardware resources, including the processor 112 and storage 111 of the database verification sub-system 110 via, e.g., a bus 113. Thus, the account management service 120 may include a memory including software and software instructions, such as, e.g. machine learning models and/or logic for accessing, manipulating, modifying and adding to an account 114 stored in the storage 111.

In some embodiments, the feature extraction engine 130 may employ the first electronic activity data entry 103 and the second electronic activity data entry 104 to extract features for determining whether the first electronic activity data entry 103 and the second electronic activity data entry 104 are duplicative. To do so, in some embodiments, the feature extraction engine 130 may extract attributes and characteristics to formulate features for use in a machine learning model to recognize duplicate data entries based on prior user behaviors in disputing duplicate data entries.

Accordingly, in some embodiments, the feature extraction engine 130 may extract data items such as, e.g., e.g., a user identifier associated with each data entry, a third-party entity identifier associated with each data entry, an activity type identifier, an activity value or activity quantity, a time data item, a location data item, a date data item, a device type or device identifier associated with the electronic activity execution device 101, an activity description, or other attributes representing characteristics of each data entry. For example, in some embodiments, the feature extraction engine 130 may examine metadata associated with each first electronic activity data entry 103 and second electronic activity data entry 104 to identify, e.g., location, date, time, entity or device identifiers, entity and/or device type, a value or quantity, an activity operation and/or operation type, associated data fraud or security checks among other attributes and characteristics associated with the first electronic activity data entry 103 and second electronic activity data entry 104. However, in some embodiments, one or more of the attributes and characteristics may be explicitly specified in the first electronic activity data entry 103 and second electronic activity data entry 104 or, e.g., in the user profile 115. In some embodiments, the first electronic activity data entry 103 and second electronic activity data entry 104 may each also specify, e.g., the user identifier, third-party entity identifier, the activity value or activity quantity, the activity type, the activity operation, among other data attributes and characteristics and combinations thereof.

In some embodiments, the feature extraction engine 130 may produce features characterizing differences between the first electronic activity data entry 103 and the second electronic activity data entry 104 based on the attributes and characteristics extracted from metadata, from the data items specified in the activities, or both. For example, the feature extraction engine 130 may calculate the difference between the activity value of the first electronic activity data entry 103 and the activity value of the second electronic activity data entry 104, a difference in time, date and/or location between the first electronic activity data entry 103 and the second electronic activity data entry 104.

For example, the first electronic activity data entry 103 may include a transaction authorization request, and the second electronic activity data entry 104 may include a posted transaction record. The feature extraction engine 130 may extract, e.g., authorization amount, authorization date or date of transaction, authorization time (e.g., time of swipe at a point of sale device), merchant name, merchant class or merchant category code (MCC), Merchant Location, approval status (e.g., approved or denied), transaction identifier, date of transaction posted, time of transaction posted, a posted amount, a difference between the posted amount and the authorization amount (e.g., a tip amount), tip percentage, among other features.

In some embodiments, the feature extraction engine 130 may also extract features from a history of electronic activities, e.g., accessed via the activity history 116 and dispute history 117 of the account 114 associated with the first electronic activity data entry 103. Using the history, the feature extraction engine 130 may generate training data for training a machine learning model to predict whether the first electronic activity data entry 103 and second electronic activity data entry 104 are likely to be duplicative according to the extracted features. Accordingly, similar to the attributes and characteristics of the first electronic activity data entry 103 and second electronic activity data entry 104, the feature extraction engine 130 may extract from each data entry in the history features including, e.g., location, date, time, entity or device identifiers, entity and/or device type, a value or quantity, an activity operation and/or operation type, associated data fraud or security checks among other attributes and characteristics associated with each data entry and combinations thereof.

In some embodiments, the feature extraction engine 130 may encode the features extracted from activity records (e.g., the first electronic activity data entry 103, second electronic activity data entry 104, past data entries in the activity history 116 and past disputed data entries in the dispute history 117) into a feature vector. In some embodiments, the feature vector may include a one-dimensional vector of values representing each extracted feature. Accordingly, the feature vector may be efficiently ingested by a machine learning model for prediction.

In order to implement the feature extraction engine 130, the feature extraction engine 130 may be implemented as one or more computer engines that may include software components, hardware components, or a combination thereof. For example, each computer engine may include a dedicated processor and storage. However, in some embodiments, the computer engines share hardware resources, including the processor 112 and storage 111 of the database verification sub-system 110 via, e.g., a bus 113. Thus, the feature extraction engine 130 may include a memory including software and software instructions, such as, e.g. generating and determining attributes characterizing the attributes and characteristics of the first electronic activity data entry 103 and second electronic activity data entry 104.

In some embodiments, the duplicate detection model engine 140 may ingest the feature vector produced by the feature extraction engine 130, e.g., by receiving the feature vector via the bus 113, or directly from the feature extraction engine 130. In some embodiments, the feature vector can include features from electronic activity data entries in the activity history 116, the dispute history 117 or other dataset. Using such features, a machine learning model, such as a duplicate entry model, may be trained to predicting a determination of whether the second electronic activity data entry 104 is a duplication of the first electronic activity data entry 103 based on training using the dispute history 117.

In some embodiments, the dispute history 117 may include electronic activity data entries that have been verified by the account management service 120 but disputed by a user. Accordingly, the dispute history 117 may be used to construct a training set of electronic activity data entries having duplicative attributes. The electronic activities in the dispute history 117 may be matched up with the corresponding electronic activity data entries from the activity history 116 to construct training labels for each electronic activity data entry. Thus, feature vectors for each electronic activity data entry can be ingested by the machine learning model for prediction, and the prediction may be compared against the training label for each electronic activity data entry to determine a loss with which to train the machine learning model.

In some embodiments, based on the training, the duplicate detection model engine 140 may predict, e.g., a prediction of whether the second electronic activity data entry 104 is a duplicate of the first electronic activity data entry 103. In some embodiments, the prediction may be, e.g., a classification of a duplicative or non-duplicative data entry for the second electronic activity data entry 104, or other form of prediction. Accordingly, the duplicate detection model engine 140 may employ, e.g., a classifier model, or other suitable machine learning model or combination thereof.

In some embodiments, the duplicate detection model engine 140 may be configured to utilize one or more exemplary AI or machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
    ii) Transfer the input data to the exemplary neural network model,
    iii) Train the exemplary model incrementally,
    iv) determine the accuracy for a specific number of timesteps,
    v) apply the exemplary trained model to process the newly-received input data,
    vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values, functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, regression or classifier models may produce a numerical output. For example, a classifier may produce a numerical probability between 0.0 and 1.0 representing, e.g., a probability of anomalous user-specified data based on the user's account 114. Accordingly, to form a determination of whether the first electronic activity data entry 103 and second electronic activity data entry 104 include anomalous user-specified data, the duplicate detection model engine 140 may compare the probability of duplicative data entries to a probability threshold, where a probability greater than the probability threshold indicates a prediction of duplicative data entry 105. Alternatively, the probability may indicate a probability of non-duplicative data entries (e.g., unique electronic activities for each electronic activity data entry). Accordingly, the probability of non-duplicative data entries exceeding the probability threshold would indicate a prediction of non-duplicative data entries for an electronic activity, and the probability of non-duplicative data being below the probability threshold would indicate the prediction of duplicative data entry 105.

In order to implement the duplicate detection model engine 140, the duplicate detection model engine 140 may be implemented as one or more computer engines that may include software components, hardware components, or a combination thereof. For example, each computer engine may include a dedicated processor and storage. However, in some embodiments, the computer engines share hardware resources, including the processor 112 and storage 111 of the database verification sub-system 110 via, e.g., a bus 113. Thus, the duplicate detection model engine 140 may include a memory including software and software instructions, such as, e.g. machine learning models and/or logic for predicting whether the user-specified data items of the first electronic activity data entry 103 are correct based on learning user behavior.

In some embodiments, upon prediction of the duplicative data entry 105, the database verification sub-system 110 may automatically reject the second electronic activity data entry 104. In some embodiments, the duplicate detection model engine 140 may provide the prediction to the account management service 120 to manage the account 114 according to whether the second electronic activity data entry 104. Where the prediction is that the second electronic activity data entry 104 is a duplicate of the first electronic activity data entry 103, the account management service 120 may cancel or otherwise remove the second electronic activity data entry 104 from the activity history 116. But where the prediction is of a non-duplicate, the account management service 120 may validate, authorize, or otherwise permission the second electronic activity data entry 104 for the activity history 116.

In some embodiments, upon prediction of the duplicative data entry 105, the database verification sub-system 110 may notify a user of the duplicative data entry 105, e.g., via a user computing device 102. In some embodiments, the user computing device 102 may be any suitable computing device, such as, e.g., a laptop computer, desktop computer, tablet, smartphone, smartwatch, or other computing device including mobile devices, wearables, et cetera.

In some embodiments, the database verification sub-system 110 may generate a notification including the prediction of the duplicative data entry 105 to deliver to the user computing device 102. For example, the notification may include, e.g., an email, a simple message service (SMS) message, a multi-media message service (MMS) message, a rich communication service (RCS) message, an internet messaging message (e.g., Apple iMessage, WhatsApp, Facebook Messenger, Signal, Telegram, Skype, or other internet-based messaging service), social media message, telephone call, or any other suitable messaging technique. In some embodiments, the notification may be an application notification, such as, e.g., a push notification from an application associated with the database verification sub-system 110 (e.g., a banking application, social media application, or other suitable application).

In some embodiments, where the duplicative data entry 105 is identified, the duplicative data entry 105 may indicate that the second electronic activity data entry 104 is incorrectly, fraudulently or otherwise erroneously submitted in duplication of the first electronic activity data entry 103. As a result, the user may dispute the second electronic activity data entry 104 based on the duplicative data entry 105. Therefore, the user computing device 102 may be configured to produce a dispute interface 106 in response to the duplicative data entry 105.

In some embodiments, the user computing device 102 may include a software application or program that include functionality to detect the receipt of the duplicative data entry 105 and produce the dispute interface 106 in response. In some embodiments, the duplicative data entry 105 includes functionality to cause the user computing device 102 to display the dispute interface 106. For example, the notification of the duplicative data entry 105 may include a link that, upon selection, may automatically generate an internet-based request to dispute the second electronic activity data entry 104. In another example, the user computing device 102 may include an application associated with the database verification sub-system 110 that may generate and display the dispute interface 106 automatically in response to the duplicative data entry 105.

In some embodiments, the dispute interface 106 may include user interface elements that provide details of the duplicative data entry 105 to the user. For example, the dispute interface 106 may identify the first electronic activity data entry 103 and the second electronic activity data entry 104 associated with the duplicative data entry 105, the third-party entity associated with the first electronic activity data entry 103 and the second electronic activity data entry 104, a date of the first electronic activity data entry 103 and the second electronic activity data entry 104, a time of the first electronic activity data entry 103 and the second electronic activity data entry 104, a location of the first electronic activity data entry 103 and the second electronic activity data entry 104, a value or quantity of the first electronic activity data entry 103 and the second electronic activity data entry 104, among other suitable information. In some embodiments, accompanying the information may be a user-selectable interface element providing one-click functionality to dispute the second electronic activity data entry 104 on the grounds of the duplicative data entry 105. Selection of this one-click interface element may produce a data entry dispute 107 and issue the data entry dispute 107 to the database verification sub-system 110.

In some embodiments, the user computing device 102 may issue the data entry dispute 107 by communicating the data entry dispute 107 to the database verification sub-system 110. In some embodiments, the data entry dispute 107 may trigger in the database verification sub-system 110, e.g., by the account management service 120, a process to dispute the second electronic activity data entry 104. In some embodiments, the dispute may automatically invalidate the second electronic activity data entry 104 and remove the second electronic activity data entry 104 from the activity history 116 of the account 114. In some embodiments, the dispute may also send a request to the electronic activity execution device 101 to modify or correct the second electronic activity data entry 104, or any other suitable response to the dispute 107. Accordingly, the database verification sub-system 110 may enable users to quickly and efficiently correct errors and fraud in electronic activities via the real-time efficient automatic detection and notification of duplicative data entry 105.

Figure 2A:
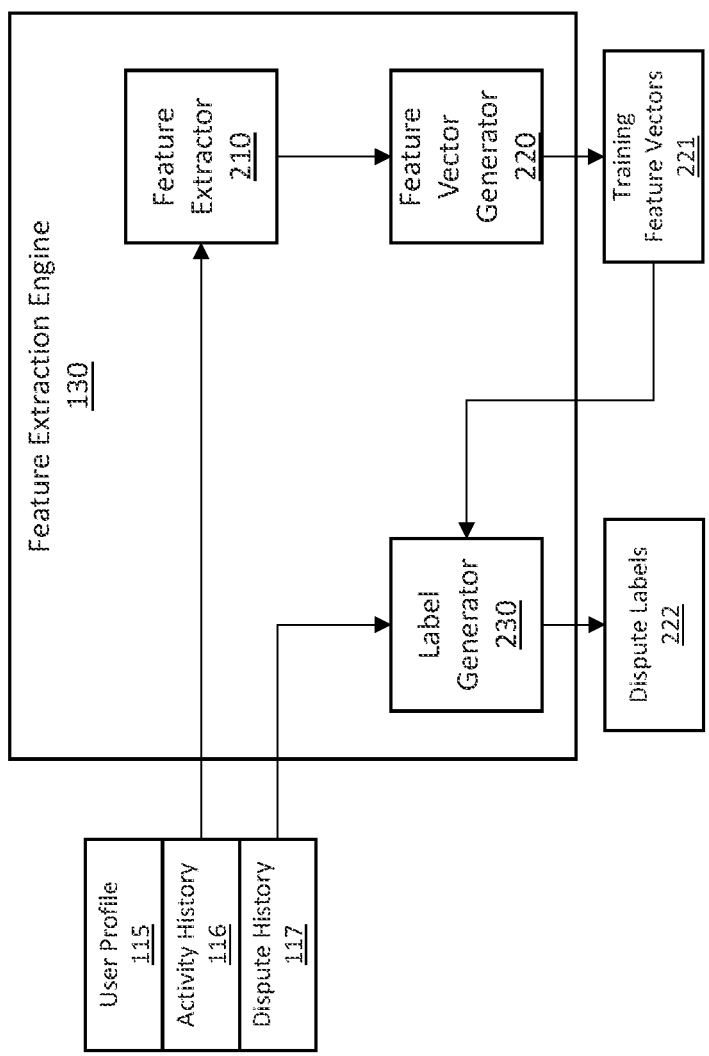

FIG. 2A is a block diagram of another exemplary computer-based system including a training arrangement of a feature extraction engine for the verification of electronic activities based on historical duplicate data entries in accordance with one or more embodiments of the present disclosure.

In some embodiments, the feature extraction engine 130 may use the account 114 of a user to generate a training dataset for prediction of duplicative data entries in electronic activities associated with the user. To facilitate quick and accurate detection of duplicated data entries (e.g., duplicative data entry 105 as described above), the feature extraction engine 130 may leverage the user's account 114 to build a training dataset based on past user behaviors in disputing data entries as duplicative.

Accordingly, in some embodiments, the feature extraction engine 130 may access the data entries of the activity history 116 and dispute entries of the dispute history 117 representing the user's behavior in disputing the data entries as duplicative. In some embodiments, to represent the dispute behaviors, the feature extraction engine 130 may produce a set of training feature vectors 221.

In some embodiments, each data entry in the activity history 116 may include, e.g., activity data of a verification request, e.g., activity identifier of the associated electronic activity, location, date, device identifiers, the user identifier, third-party entity identifier, a requested activity value or activity quantity, the activity type, the activity operation, activity verification date, among other data attributes and characteristics and combinations thereof.

In some embodiments, the dispute history 117 may include records of user disputes in response to data entries in the activity history 116. Accordingly, each data entry in the dispute history 117 may include, e.g., dispute data including, e.g., data entry identifier of the associated data entry in the activity history 116, disputed attributes or characteristics (e.g., including, e.g., location, date, time, entity or device identifiers, entity and/or device type, a value or quantity, an activity operation and/or operation type, associated data fraud or security checks among other attributes and characteristics), among other dispute related data and combinations thereof.

In some embodiments, a feature extractor 210 may first identify candidate duplicate data entries. Similar to above, the feature extractor 210 may test each data entry in the activity history 116 with each other data entry in the activity history 116. In some embodiments, to facilitate efficient matching, the feature extractor 210 may restrict the matching operation to only data entries having a time data item indicating a time of execution within an electronic activity proximity defined by a predetermined interval around the time data item indicating the time of execution of each data entry. Because duplicate data entries are generally duplicated in a short amount of time, the electronic activity proximity may correspond to the short amount of time to capture the most likely time period within which each data entry would be duplicated. Such an electronic activity proximity may include a time interval within, e.g., about one minute to five minutes, about five to ten minutes, about ten to fifteen minutes, about fifteen to twenty minutes, or any combination thereof.

In some embodiments, duplicate data entries are often issued by a same electronic activity execution device. Accordingly, the feature extractor 210 may filter data entries in the activity history 116 may, e.g., device identifier, device type identifier, location identifier or a combination thereof associated with each data entry in the activity history 116. The filtering can be configured to have, e.g., a device identifier, device type, location or combination thereof within a predetermined similarity to the device identifier, device type and location of the second electronic activity data entry 104. In some embodiments, the predetermined similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify the electronic activity execution device as the same device between any two data entries.

In some embodiments, similarity may be measured between each of the device identifier, device type identifier and location identify separately, and the respective similarity scores summed, averaged, or otherwise combined. In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of the device identifier, device type identifier and location identify. The group key may be produced by creating a single string, list, or value from combining each of, e.g., a string, list or value representing each of the device identifier, device type identifier and location identifier into a single data item. The similarity between each data entry of any two data entries may then be measured as the similarity between the associated hashes and/or group keys. The measured similarity may then be compared against the predetermined similarity score to determine candidate data entries for each pair of two data entries.

In some embodiments, through any combination of the filtering and similarity measurement described above, the feature extractor 210 may identify each data entry in the activity history 116 that has a matching candidate duplicate data entry, among other possible candidate duplicate data entries.

In some embodiments, the feature extractor 210 identifies and extracts attributes of each pairing of candidate duplicate data entries and associated electronic activities indicative of the relationship between the data entries of each pairing of candidate duplicate data entries. In some embodiments, the attributes are relevant to the determination of duplicative data entries based on the user's history of disputing data entries as duplicative. In some embodiments, the relevant attributes can be predefined according to, e.g., selection by an administrative user administering the feature extraction engine 130, or other suitable method for determining predefined attributes to extract. In some embodiments, the predefined attributes can be adjusted at any time, e.g., by the administrative user, or may be fixed.

In some embodiments, examples of relevant attributes may include, e.g., location, date, time, entity or device identifiers, entity and/or device type, a value or quantity, an activity operation and/or operation type, an entity history of duplicated data entries (e.g., frequency or other metric) associated data fraud or security checks among other attributes and characteristics predictive of whether any two data entries are duplicative. In some embodiments, for example, the electronic activity may include a payment transaction with two data entries entered into the activity history 116 requesting or authorizing payment for the same payment transaction. Relevant attributes for such a transaction that may be predictive of a double-swipe of a credit card or other double-charge event, which may include, e.g., merchant name, merchant type (e.g., merchant category code (MCC)), transaction amount, transaction amount difference between the two data entries, time of transaction, time difference between the two entries, date of transaction, date difference between the two entries, location of transaction, transaction mode (online versus swipe, for example), point-of-sale entry and mode, fraud check results, merchant history of double swipes (e.g., frequency or other metric), among other suitable attributes and combinations thereof.

In some embodiments, the feature extractor 210 may include dynamic or learned attributes predictive of a duplicative data entry. For example, a statistical model may be employed for, e.g., univariate selection, a correlation matrix with heatmap, or other suitable statistical model for feature selection. In an example, the model is a machine learning model for selecting attributes according to feature importance, such as, e.g., a suitable feature selection classifier, or other suitable machine learning model for feature importance.

In some embodiments, the attributes may be encoded into a training feature vector 221 by a feature vector generator 220. In some embodiments, the training feature vector 221 may be configured for ingestion by a machine learning model to produce a duplication classification that indicates whether a data entry is duplicative of another. Accordingly, the feature vector generator 220 may encode each attribute into a numerical encoding. For example, attributes that already have a numerical value may have a numerical encoding equivalent to the numerical value, while attributes that include character strings or other non-numerical data types can be converted to a numerical value. In some embodiments, attributes with non-numerical data types may include, e.g., location, date, entity or device identifiers, entity and/or device type, an activity operation and/or operation type, data fraud or security check results among other attributes and characteristics. These attributes may be converted to numerical values using, e.g., a per-character numerical assignment to each character of the attribute, a numerical label based on predefined assignments of attributes to a numerical value (e.g., each merchant category code having a particular assigned numerical value to represent each merchant category code) or other suitable encoding technique.

In some embodiments, the feature vector generator 220 may generate a vector representation of the encoded attributes in, e.g., an n-dimensional vector, such as a one dimensional vector. For example, the vector representation may include a one dimensional vector having a length corresponding to the number of the selected attributes. The encoding of each attribute may then be recorded in a predefined index location in the one dimensional vector to produce the training feature vector 221 representative of the selected relevant attributes.

In some embodiments, the feature extraction engine 130 may analyze each data entry in the activity history 116 to determine a training feature vector 221 for each data entry. To use these training feature vectors 221 as a training dataset for training a machine learning model, the feature extraction engine 130 may advantageously automatically generate dispute labels 222.

In some embodiments, the label generator 230 may extract activity data that may be used to identify a particular data entry from each record in the dispute history 117 in order to match each record in the dispute history 117 to each record in the activity history 116 associated with the same particular electronic activity. For example, the label generator 230 may extract the data entry identifier from a record in the dispute history 117 and match it to a matching data entry identifier in a record in the activity history 116, thus identifying the disputed data entry associated with a particular electronic activity. Therefore, the label generator 230 may identify data entries that have been disputed by a user as duplicating another data entry.

Similar to the feature extractor 210 above, in some embodiments, a data entry identifier may not be present in each record. Accordingly, in some embodiments, the label generator 230 may instead or additionally employ a parsing mechanism to parse each record and match data entries of the activity history 116 with dispute entries of the dispute history 117 according to similarity. For example, the label generator 230 may extract, e.g., a date, a location, a third-party entity, an entity type, or any other suitable information and combinations thereof from each data. The information may then be compared between pairings of dispute entry and each data entry and scored according to, e.g., Pearson's correlation, Spearman's correlation, Kendall's Tau, Cosine similarity, Jaccard similarity, or other similarity metric and combinations thereof. In some embodiments, the pairings may be scored according to, e.g., the Euclidean distance, the Manhattan distance, or other suitable distance metrics and combinations thereof. The data entry having the highest score for each dispute entry may be deemed to match.

In some embodiments, based on each dispute entry matched a data entry, the label generator 230 may determine a dispute attribute for the data entry, and thus for the associated training feature vector 221. For example, during training, the label generator 230 may access a training feature vector 221 to be ingested by the machine learning model and compare the data entry of the training feature vector 221 to the dispute entries and generate for that training feature vector 221 a dispute label 222 indicating whether the data entry of the training feature vector 221 has been disputed. While training, the machine learning model may use the dispute label 222 for each training feature vector 221 assess the accuracy of the prediction by the machine learning model and determine an error. As a result, the feature extraction engine 130 may utilize an account to build a training dataset to training a machine learning model for the associated user's behaviors in disputing data entries.

In some embodiments, the training dataset may be updated using new batches of data entries in the user's account. In some embodiments, the batches may be provided periodically, such as, e.g., every day, every week, every month, or according to any other suitable period. For example, for electronic activities including electronic transactions for services, the period may include every statement period where transactions and dispute are posted to the user's account.

In some embodiments, rather than updating the training dataset with new data entries, the training dataset may be reconstructed with a rolling window of data entries. By reconstructing rather than updating the training dataset, the duplicate detection model engine 140 may be trained against a user's recent dispute behaviors. Accordingly, each batch may include both new data entries of the activity history 116 and the dispute history 117, as well as old records from within the rolling window. For example, the rolling window may span a period of time include, e.g., 1 month, 2 months, 3 months, 4 months, 5 months, 6 months or greater. Accordingly, the training dataset may be formed from recent user behaviors.

Figure 2B:
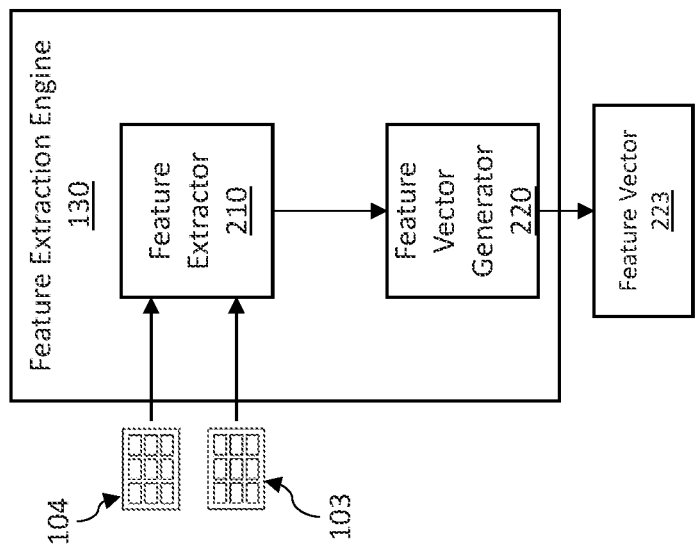

In some embodiments, the feature extraction engine 130 may perform a similar process to generate a feature vector 223 for the first electronic activity data entry 103 and second electronic activity data entry 104, as show in FIG. 2B. FIG. 2B is a block diagram of another exemplary computer-based system including a prediction arrangement of the feature extraction engine of FIG. 2A for the verification of electronic activities based on historical user-specified value data in accordance with one or more embodiments of the present disclosure.

In some embodiments, the feature extractor 210 identifies and extracts attributes of the first electronic activity data entry 103 and second electronic activity data entry 104 and associated electronic activities indicative of the relationship between the first electronic activity data entry 103 and second electronic activity data entry 104. In some embodiments, the attributes are relevant to the determination of duplicative data entries based on the user's history of disputing data entries as duplicative. In some embodiments, the relevant attributes can be predefined according to, e.g., selection by an administrative user administering the feature extraction engine 130, or other suitable method for determining predefined attributes to extract. In some embodiments, the predefined attributes can be adjusted at any time, e.g., by the administrative user, or may be fixed.

In some embodiments, examples of relevant attributes may include, e.g., location, date, time, entity or device identifiers, entity and/or device type, a value or quantity, an activity operation and/or operation type, an entity history of duplicated data entries (e.g., frequency or other metric) associated data fraud or security checks among other attributes and characteristics predictive of whether any two data entries are duplicative. In some embodiments, for example, the electronic activity may include a payment transaction with two data entries entered into the activity history 116 requesting or authorizing payment for the same payment transaction. Relevant attributes for such a transaction that may be predictive of a double-swipe of a credit card or other double-charge event, which may include, e.g., merchant name, merchant type (e.g., merchant category code (MCC)), transaction amount, transaction amount difference between the two data entries, time of transaction, time difference between the two entries, date of transaction, date difference between the two entries, location of transaction, transaction mode (online versus swipe, for example), point-of-sale entry and mode, fraud check results, merchant history of double swipes (e.g., frequency or other metric), among other suitable attributes and combinations thereof.

In some embodiments, the feature extractor 210 may include dynamic or learned attributes predictive of a duplicative data entry. For example, a statistical model may be employed for, e.g., univariate selection, a correlation matrix with heatmap, or other suitable statistical model for feature selection. In an example, the model is a machine learning model for selecting attributes according to feature importance, such as, e.g., a suitable feature selection classifier, or other suitable machine learning model for feature importance.

In some embodiments, the attributes may be encoded into a feature vector 223 by a feature vector generator 220. In some embodiments, the feature vector 223 may be configured for ingestion by a machine learning model to produce a duplication classification that indicates whether one of the first electronic activity data entry 103 and second electronic activity data entry 104 is duplicative of the other. Accordingly, the feature vector generator 220 may encode each attribute into a numerical encoding. For example, attributes that already have a numerical value may have a numerical encoding equivalent to the numerical value, while attributes that include character strings or other non-numerical data types can be converted to a numerical value. In some embodiments, attributes with non-numerical data types may include, e.g., location, date, entity or device identifiers, entity and/or device type, an activity operation and/or operation type, data fraud or security check results among other attributes and characteristics. These attributes may be converted to numerical values using, e.g., a per-character numerical assignment to each character of the attribute, a numerical label based on predefined assignments of attributes to a numerical value (e.g., each merchant category code having a particular assigned numerical value to represent each merchant category code) or other suitable encoding technique.

In some embodiments, the feature vector generator 220 may generate a vector representation of the relationship between the first electronic activity data entry 103 and second electronic activity data entry 104 according to the encoded attributes. The vector representation of the relationship may include, e.g., an n-dimensional vector, such as a one-dimensional vector. For example, the vector representation may include a one-dimensional vector having a length corresponding to the number of the selected attributes. The encoding of each attribute may then be recorded in a predefined index location in the one dimensional vector to produce the feature vector 223 representative of the selected relevant attributes.

Figure 3A:
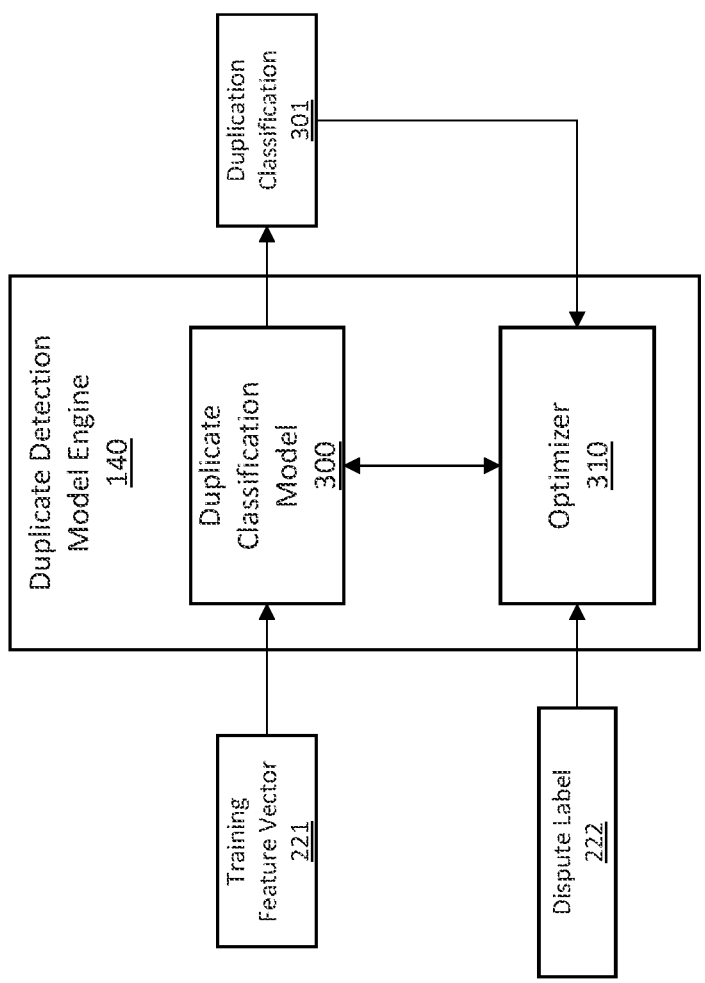

FIG. 3A is a block diagram of another exemplary computer-based system including a training arrangement of an attribute accuracy model engine for the verification of electronic activities based on historical user-specified post-activity value data in accordance with one or more embodiments of the present disclosure.

In some embodiments, a duplicate detection model engine 140 may be employed to train an duplicate classification model 300 to predict duplication classifications 301 for a user based on the training feature vectors 221 associated with the user's account, e.g., as described above with reference to FIG. 2A.

In some embodiments, the duplicate classification model 300 ingests each training feature vector 221 and produces a prediction of a duplication classification 301 for each training feature vector 221. In some embodiments, to produce this prediction, the duplicate classification model 300 may include a machine learning model including a classification model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the duplicate classification model 300 may advantageously include a random forest classification model Accordingly, the duplicate classification model 300 ingests a training feature vector 221 and processes the attributes encoded therein using the classification model to produce a model output vector. In some embodiments, the model output vector may be decoded to generate a label including the duplication classification 301.

In some embodiments, the model output vector may include or may be decoded to reveal a numerical output, e.g., a probability value between 0 and 1. In some embodiments, the probability value may indicate a degree of probability that the candidate duplicated data entries of the training feature vector 221 are duplicative. In some embodiments, the duplicate classification model 300 may test the probability value against a probability threshold, where a probability value greater than the probability threshold indicates, e.g., that the candidate duplicated data entries of the training feature vector 221 are duplicative, or that the candidate duplicated data entries of the training feature vector 221 are not duplicative. For example, the probability threshold can be, e.g., greater than 0.5, greater than 0.6, greater than 0.7, greater than 0.8, greater than 0.9, or other suitable threshold value. In some embodiments, the duplicate classification model 300 may produce the duplication classification 301 based on the probability value and the probability threshold. For example, the duplication classification 301 may include a classification as duplicative where the probability value is greater than the probability threshold. However, the duplicate classification model 300 may configured such that the duplication classification 301 may include a classification as not duplicative where the probability value is greater than the probability threshold.

In some embodiments, the duplicate classification model 300 may trained based on the duplication classification 301 for the training feature vector 221 and the dispute label 222 for the training feature vector 221. Based on the difference between the duplication classification 301 and the dispute label 222, the parameters of the classification model of the duplicate classification model 300 may be updated to improve the accuracy of the duplication classification.

In some embodiments, training is performed using an optimizer 310. In some embodiments, the duplication classification 301 fed back to the optimizer 310. The optimizer 310 may also ingest the dispute label 222. In some embodiments, the optimizer 310 may employ a loss function, such as, e.g., Hinge Loss, Multi-class SVM Loss, Cross Entropy Loss, Negative Log Likelihood, or other suitable classification loss function. The loss function determines an error based on the dispute label 222 and the duplication classification 301. In some embodiments, the optimizer 310 may, e.g., backpropagate the error to the duplicate classification model 300 to update the parameters using, e.g., gradient descent, heuristic, convergence or other optimization techniques and combinations thereof.

In some embodiments, the optimizer 310 may therefore train the parameters of the duplicate classification model 300 to approximate user behaviors in specifying duplicate data entries based on the dispute labels 222. The duplicate detection model engine 140 may iterate through each training feature vector 221 in the training dataset, including predicting a duplication classification 301 and updating parameters of the duplicate classification model 300 based on the associated dispute label 222.

In some embodiments, the duplicate detection model engine 140 may be updated using new batches of training datasets from new electronic activities in the user's account 114. In some embodiments, the batches may be provided periodically, such as, e.g., every day, every week, every month, or according to any other suitable period. For example, for data entries including electronic transactions for services, the period may include every statement period where transactions and dispute are posted to the user's account.

In some embodiments, rather than updating the duplicate detection model engine 140, the duplicate detection model engine 140 may be retrained on a rolling window of data entries. By retraining rather than updating the model parameters, the duplicate detection model engine 140 may be trained against a user's recent behaviors. Accordingly, each batch received periodically may include both new records of the activity history 116 and the dispute history 117, and old records from within the rolling window. For example, the rolling window may span a period of time include, e.g., 1 month, 2 months, 3 months, 4 months, 5 months, 6 months or greater. Accordingly, the duplicate detection model engine 140 may be trained against recent user behaviors.

Figure 3B:
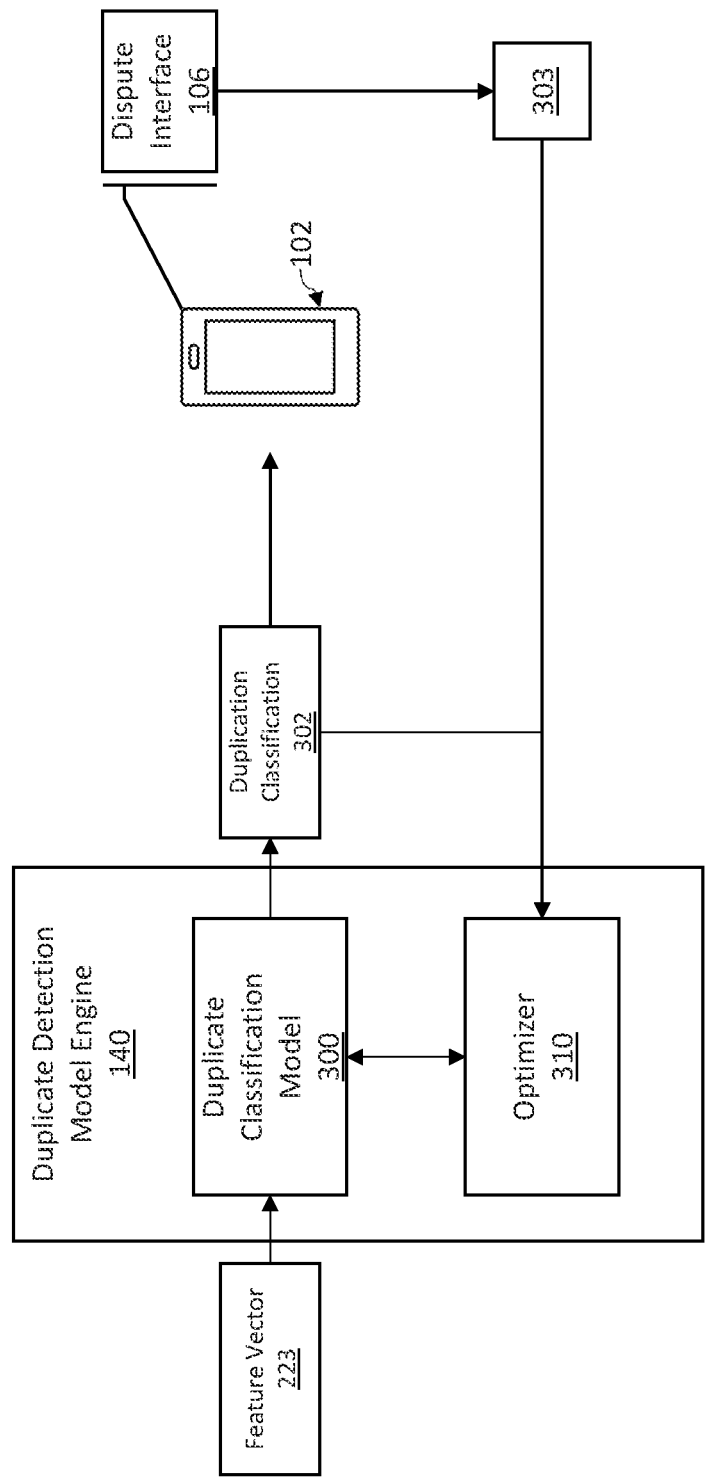

FIG. 3B is a block diagram of another exemplary computer-based system including a prediction arrangement of the attribute accuracy model engine of FIG. 3A for the verification of electronic activities based on historical user-specified post-activity value data in accordance with one or more embodiments of the present disclosure.

In some embodiments, the duplicate detection model engine 140 may utilize the duplicate classification model 300 (e.g., trained as described above with reference to FIG. 3A) to predict a duplication classification 302 for the feature vector 223 associated with the user's account, e.g., the feature vector 223 as described above with reference to FIG. 2B.

In some embodiments, the duplicate classification model 300 ingests each training feature vector 221 and produces a prediction of a duplication classification 302 for each training feature vector 221. In some embodiments, to produce this prediction, the duplicate classification model 300 may include a machine learning model including a classification model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the duplicate classification model 300 may advantageously include a random forest classification model Accordingly, the duplicate classification model 300 ingests a training feature vector 221 and processes the attributes encoded therein using the classification model to produce a model output vector. In some embodiments, the model output vector may be decoded to generate a label including the duplication classification 302.

In some embodiments, the model output vector may include or may be decoded to reveal a numerical output, e.g., a probability value between 0 and 1. In some embodiments, the probability value may indicate a degree of probability that the first electronic activity data entry 103 and the second electronic activity data entry 104 of the feature vector 223 are duplicative. In some embodiments, the duplicate classification model 300 may test the probability value against a probability threshold, where a probability value greater than the probability threshold indicates, e.g., that the first electronic activity data entry 103 and the second electronic activity data entry 104 of the feature vector 223 are duplicative, or that the first electronic activity data entry 103 and the second electronic activity data entry 104 of the feature vector 223 are not duplicative. For example, the probability threshold can be, e.g., greater than 0.5, greater than 0.6, greater than 0.7, greater than 0.8, greater than 0.9, or other suitable threshold value. In some embodiments, the duplicate classification model 300 may produce the duplication classification 302 based on the probability value and the probability threshold. For example, the duplication classification 302 may include a classification as duplicative where the probability value is greater than the probability threshold. However, the duplicate classification model 300 may configured such that the duplication classification 302 may include a classification as not duplicative where the probability value is greater than the probability threshold.

In some embodiments, where the duplication classification 302 includes a classification label of duplicative data entries for the feature vector 223, the duplication classification 302 may be provided to the user computing device 102, e.g., as a prediction of the duplicative data entry 105 described above with reference to FIG. 1. In some embodiments, the duplication classification 302 of the duplicative data entry 105 may trigger the user computing device 102 to generate and display the dispute interface 106. In some embodiments, the dispute interface 106 includes a depiction or representation of, e.g., the first electronic activity data entry 103 and the second electronic activity data entry 104, the electronic activity attributes, an indication that data entries are duplicative, or a combination thereof, as well as an interface element to confirm or deny the duplication classification 302. For example, the user may input a user interaction 303 with an option to confirm the duplication classification 302 as correct or deny the duplication classification 302 as incorrect. In some embodiments, the user interaction 303 may include a user selection of a confirm option or a deny option relative to the duplication classification 302.

In some embodiments, the user interaction 303 may also include a lack of a selection. For example, the user may choose to ignore the alert of the dispute interface 106, e.g., by selecting an "ignore" element, or by not providing any selection at all. In some embodiments, where the user ignores the dispute interface 106, the lack of selection may be interpreted as a command to not take action for the duplication classification 302. Where the duplication classification 302 includes a classification as duplicative, a command to not take action may represent a denial that the data entries are duplicative. Conversely, where the duplication classification 302 includes a classification as non-duplicative, a command to not take action may represent a confirmation that the date entries are non-duplicative. Accordingly, the user interaction 303 may include an indication of a confirmation or denial of the duplication classification 302 based on whether the duplication classification 302 is duplicative or non-duplicative.

In some embodiments, in the case of the lack of any selection, the user interaction 303 may be determined to be an ignore interaction after a predetermined period of time has elapsed without any user selection. For example, the optimizer 310 may include a timer that starts upon generation of the duplication classification 302 and ends upon the predetermined time period elapsing. Alternatively, or in addition, the user computing device 102 and/or dispute interface 106 may include the timer that starts upon receiving the duplication classification 302. In some embodiments, the predetermined period of time may include any suitable time period for user interaction with the dispute interface 106, such as, e.g., 15 seconds, 20 seconds, 30 seconds, 40 seconds, 45 seconds, 1 minute, 2 minutes, 5 minutes, or any other suitable time period.

In some embodiments, the duplicate classification model 300 may trained based on the duplication classification 302 and the user interaction 303. Based on the difference between the duplication classification 302 and the user interaction 303, the parameters of the classification model of the duplicate classification model 300 may be updated to improve the accuracy of the duplication classification.

In some embodiments, training is performed using the optimizer 310. In some embodiments, the duplication classification 302 fed back to the optimizer 310. The optimizer 310 may also ingest the dispute label 222. In some embodiments, the optimizer 310 may employ a loss function, such as, e.g., Hinge Loss, Multi-class SVM Loss, Cross Entropy Loss, Negative Log Likelihood, or other suitable classification loss function. The loss function determines an error based on the user interaction 303 and the duplication classification 302. In some embodiments, the optimizer 310 may, e.g., backpropagate the error to the duplicate classification model 300 to update the parameters using, e.g., gradient descent, heuristic, convergence or other optimization techniques and combinations thereof.

In some embodiments, the optimizer 310 may therefore train the parameters of the duplicate classification model 300 to approximate user behaviors in disputing data entries as duplicative based on feedback including the user interaction 303. As a result, the duplicate classification model 300 may be continually trained and optimized based on user feedback.

Figure 4:
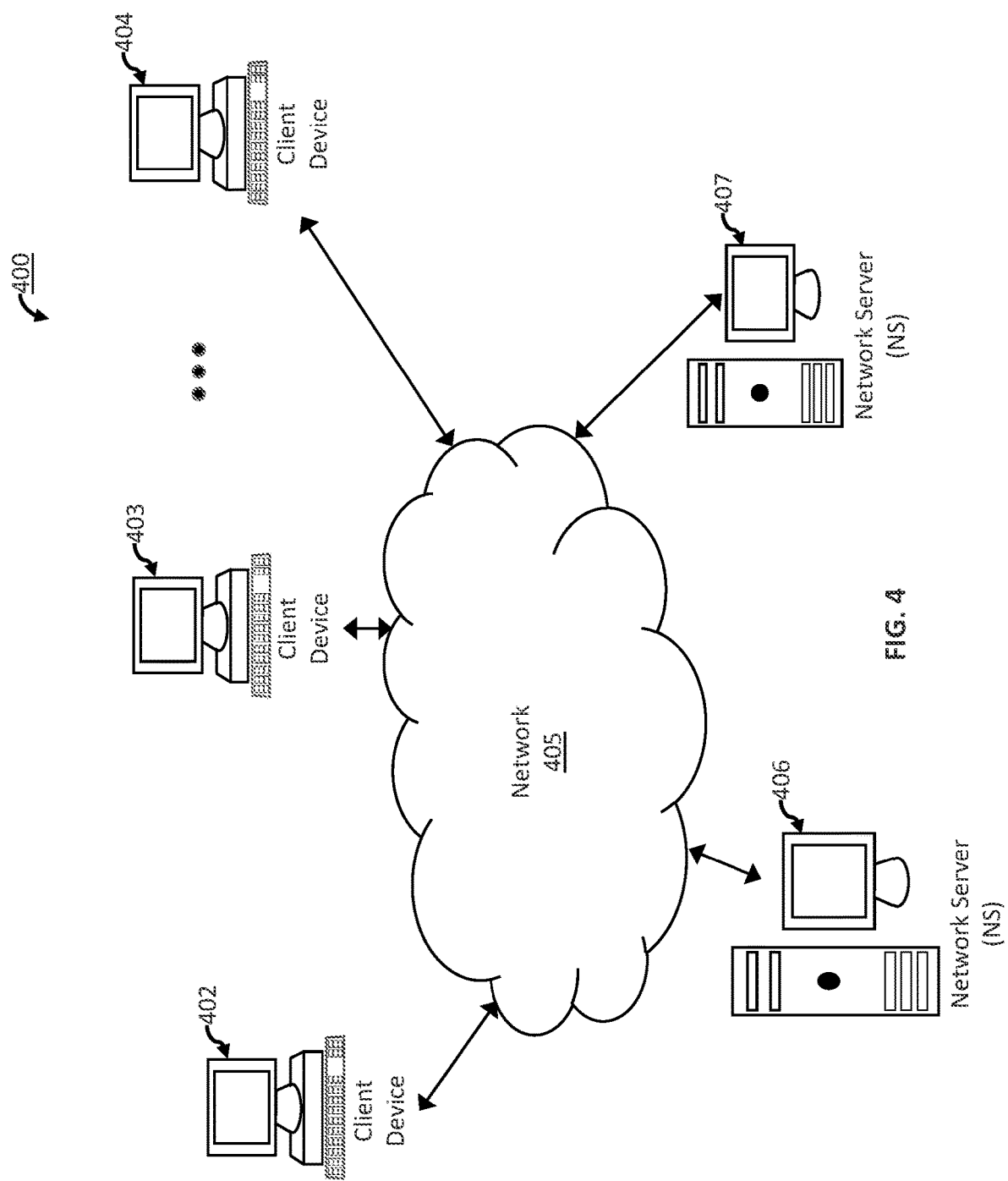

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403, through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member computing devices 402-404 may be personal computers, multiprocessor systems, microprocessor-based or programmable consumer electronics, network PCs, and the like. In some embodiments, one or more member computing devices within member computing devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member computing devices within member computing devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member computing devices within member computing devices 402-404 may include may run one or more applications, such as Internet browsers, mobile applications, voice calls, video games, videoconferencing, and email, among others. In some embodiments, one or more member computing devices within member computing devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member computing devices 402-404 may be specifically programmed by either Java, .Net, QT, C, C++ and/or other suitable programming language. In some embodiments, one or more member computing devices within member computing devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member computing devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
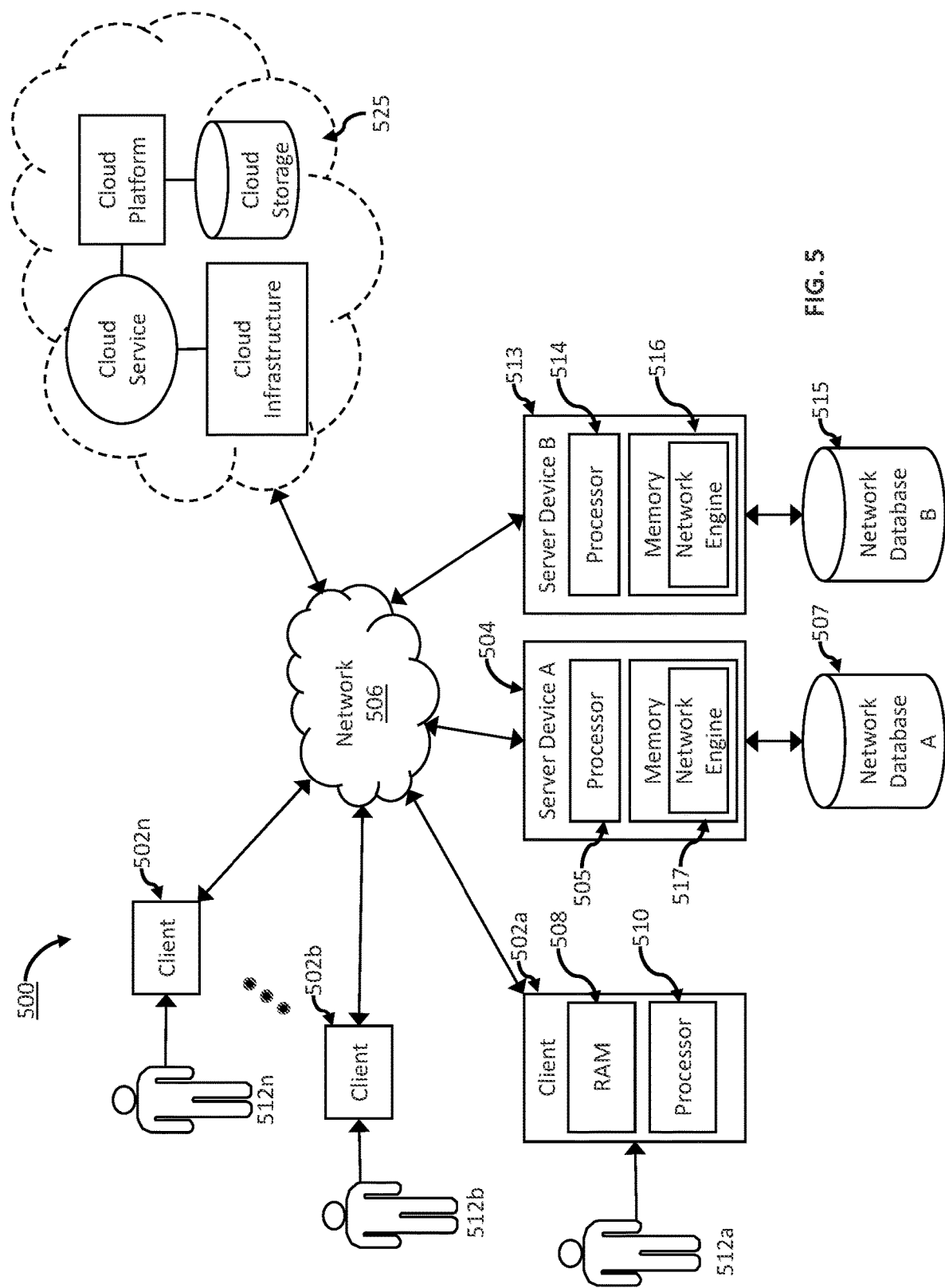

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of member computing device 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, Scala, NodeJS, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
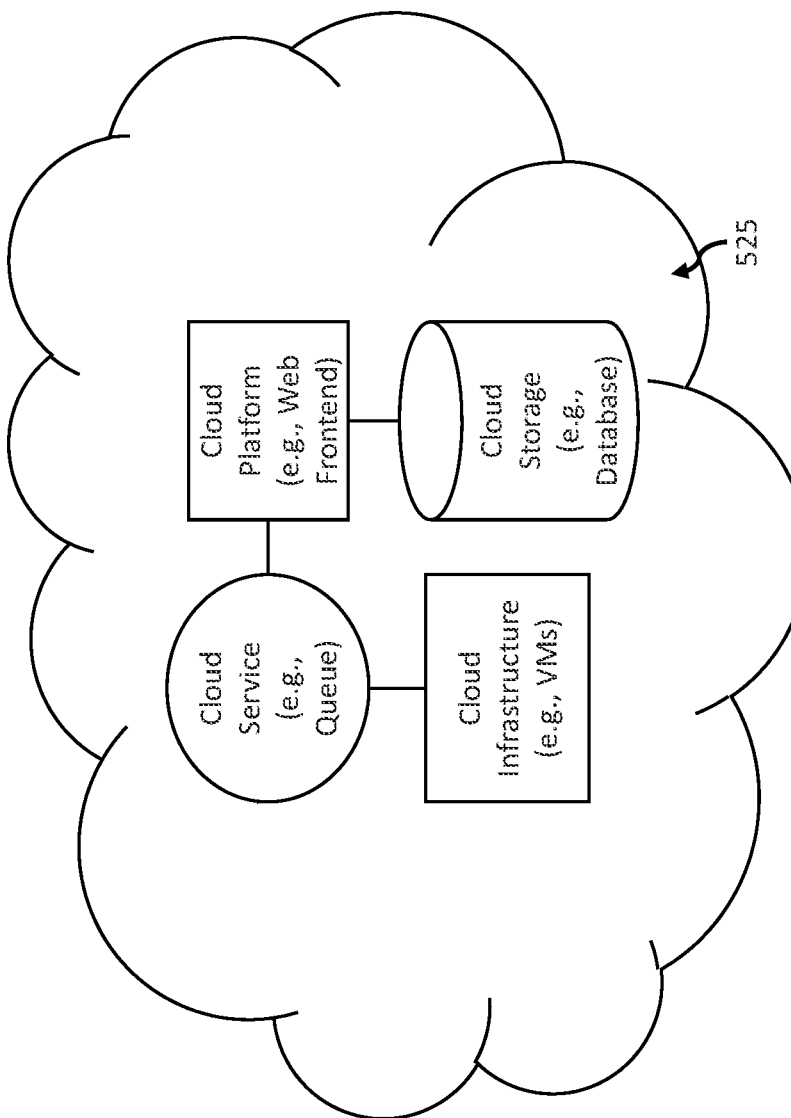
Figure 7:
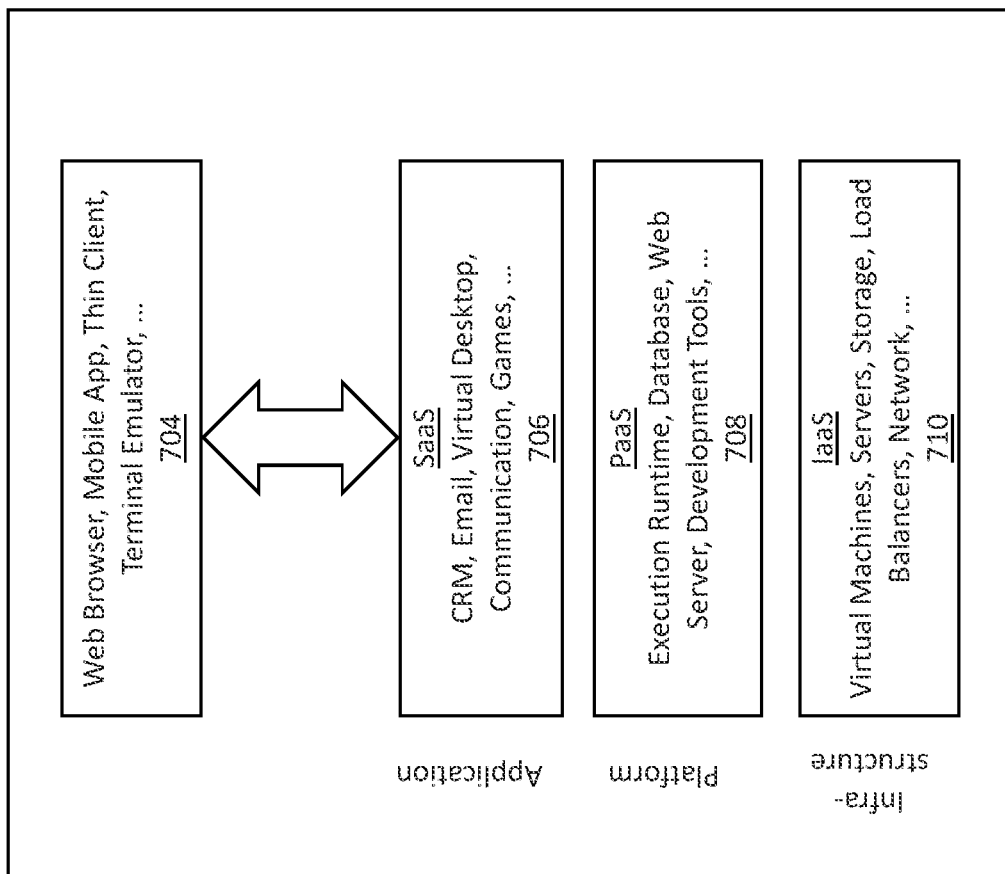

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, Scala, NodeJS, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

At least some aspects of the present disclosure will now be described with reference to the following numbered clauses.

1. A method comprising:
   receiving, by at least one processor, a plurality of data entries associated with a user;
      wherein each data entry of the plurality of data entries comprises:
         i) an electronic activity value indicative of an amount of the electronic activity,
         ii) an electronic activity time value indicative of a date and time of the electronic activity,
         iii) an entity identifier identifying an entity associated with each data entry, and
         iv) a location identifier identifying a location associated with the electronic activity;
   determining, by the at least one processor, a plurality of similar data entries in the plurality of data entries based on a matching of the entity identifier and the location identifier between the similar data entries;
   determining, by the at least one processor, a plurality of candidate duplicate data entries of the plurality of similar data entries, based on a electronic activity proximity between each electronic activity time values of each candidate duplicate data entry of the plurality of candidate duplicate data entries;
   generating, by the at least one processor, for each candidate duplicate data entry, a feature vector comprising the entity identifier, the entity location identifier, the electronic activity value and the electronic activity time value;
   submitting, by the at least one processor, each feature vector for each candidate duplicate data entry to a duplicate classification model to automatically determine at least one duplicate data entry from the plurality of candidate duplicate data entries of the plurality of similar data entries;
      wherein the duplicate classification model comprises model parameters trained according to a plurality of historical data entries and a plurality of historical dispute entries disputing past data entries;
   generating, by the at least one processor, a duplicate graphical user interface (GUI) comprising an alert message and a one-click dispute interface element;
      wherein the alert message represents the duplicate classification of an incorrect duplicate data entry; and
      wherein the one-click dispute interface element comprises a user selectable element that upon selection causes an electronic request to dispute the at least one duplicate data entry to automatically issue and file at least one electronic activity dispute; and
   causing to display, by the at least one processor, the duplicate GUI on a user computing device associated with a user of the at least one duplicate data entry.

2. A system comprising:
   at least one processor configured to execute software instructions that cause the at least one processor to perform steps to:
      receive a plurality of data entries associated with a user;
         wherein each data entry of the plurality of data entries comprises:
            i) an electronic activity value indicative of an amount of the electronic activity,
            ii) an electronic activity time value indicative of a date and time of the electronic activity,
            iii) an entity identifier identifying an entity associated with each data entry, and
            iv) a location identifier identifying a location associated with the electronic activity;
      determine a plurality of similar data entries in the plurality of data entries based on a matching of the entity identifier and the location identifier between the similar data entries;
      determine a plurality of candidate duplicate data entries of the plurality of similar data entries, based on a electronic activity proximity between each electronic activity time values of each candidate duplicate data entry of the plurality of candidate duplicate data entries;
      generate for each candidate duplicate data entry, a feature vector comprising the entity identifier, the entity location identifier, the electronic activity value and the electronic activity time value;
      submit each feature vector for each candidate duplicate data entry to a duplicate classification model to automatically determine at least one duplicate data entry from the plurality of candidate duplicate data entries of the plurality of similar data entries;
         wherein the duplicate classification model comprises model parameters trained according to a plurality of historical data entries and a plurality of historical dispute entries disputing past data entries;
      generate a duplicate graphical user interface (GUI) comprising an alert message and a one-click dispute interface element;
         wherein the alert message represents the duplicate classification of an incorrect duplicate data entry; and
         wherein the one-click dispute interface element comprises a user selectable element that upon selection causes an electronic request to dispute the at least one duplicate data entry to automatically issue and file at least one electronic activity dispute; and
      cause to display the duplicate GUI on a user computing device associated with a user of the at least one duplicate data entry.

3. The systems and methods of any of clauses 1 and/or 2, further comprising:
   determining, by the at least one processor, a group key for each data entry of the plurality of data entries; and
   determining, by the at least one processor, the matching of the entity identifier and the location identifier between the similar data entries based on the group key of each similar data entry of the similar data entries matching.

4. The systems and methods of any of clauses 1 and/or 2, wherein the alert is communicated prior to a posting of the at least one duplicate electronic activity.

5. The systems and methods of any of clauses 1 and/or 2, wherein the duplicate classification comprises a binary classification for each candidate duplicate data entry of the plurality of candidate duplicate data entries.

6. The systems and methods of any of clauses 1 and/or 2, further comprising:

receiving, by the at least one processor, a plurality of new data entries associated with at least one other new user;

determining, by the at least one processor, a plurality of similar new data entries in the plurality of new data entries based on a matching of the entity identifier and the location identifier between the similar new data entries;

determining, by the at least one processor, a plurality of candidate duplicate new data entries of the plurality of similar new data entries, based on a new electronic activity proximity between each new electronic activity time values of each potentially incorrect new data entry of the potentially incorrect new data entries;

generating, by the at least one processor, for each candidate duplicate new data entry, a new feature vector comprising a new entity identifier, a new entity location identifier, a new electronic activity value and a new electronic activity time value;

submitting, by the at least one processor, each new feature vector for each candidate duplicate new data entry to a duplicate classification model to automatically determine at least one duplicate new electronic activity from the plurality of candidate duplicate new data entries of the plurality of similar new data entries.

7. The systems and methods of any of clauses 1 and/or 2, wherein the duplicate classification model comprises a random forest model.

8. The systems and methods of any of clauses 1 and/or 2, wherein the plurality of historical data entries and the plurality of historical dispute entries comprises historical data entries and historical dispute entries from a rolling time period preceding the data entry.

9. The systems and methods of clause 8, wherein the rolling time period comprises three months preceding the data entry.

10. The systems and methods of clause 8, wherein the duplicate classification model is retrained according to a predetermined schedule.

11. The systems and methods of clause 10, wherein the predetermined schedule comprises once per week.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added, and/or any desired steps may be eliminated).

What is claimed is:

1. A method comprising:
   receiving, by at least one processor, a plurality of data entries associated with a user;
   wherein each data entry of the plurality of data entries comprises at least one attribute;
   determining, by the at least one processor, a plurality of pairs of candidate duplicate data entries based at least in part on:
   a proximity between each data entry of each pair of candidate duplicate data entries, and
   the at least one attribute between each candidate duplicate data entry of each pair of candidate duplicate data entries;
   wherein the proximity comprises a predetermined interval of time;
   inputting, by the at least one processor, each pair of candidate duplicate data entries of the plurality of pairs of candidate duplicate data entries into a duplicate classification model to automatically generate a duplicate classification indicative of at least one pair of duplicate data entries from the plurality of pairs of candidate duplicate data entries based at least in part on the at least one attribute of each candidate duplicate data entry;
   wherein the duplicate classification model comprises model parameters trained according to a plurality of historical data entries and a plurality of historical dispute entries disputing past data entries;
   generating, by the at least one processor, a duplicate graphical user interface (GUI) comprising an alert message and a one-click resolution interface element;
   wherein the alert message represents the duplicate classification of an incorrect duplicate data entry;
   wherein the one-click resolution interface element comprises a user selectable element that upon selection causes an electronic request to automatically remove at least one duplicate data entry of the at least one pair of duplicate data entries;
   causing to display, by the at least one processor, the duplicate GUI on a user computing device associated with the user of the at least one pair of duplicate data entries;
   receiving, by the at least one processor, at least one indication that the user has selected the user selectable element; and
   training, by the at least one processor, the model parameters of the duplicate classification model based at least in part on:
   the duplicate classification of the at least one pair of duplicate data entries and
   the at least one indication that the user has selected the user selectable element.

2. The method as recited in claim 1, wherein the alert is communicated prior to a posting of the at least one duplicate data entry.

3. The method as recited in claim 1, wherein the duplicate classification comprises a binary classification for each candidate duplicate data entry of the plurality of candidate duplicate data entries.

4. The method as recited in claim 1, wherein the duplicate classification model comprises a random forest model.

5. The method as recited in claim 1, wherein the plurality of historical data entries comprises historical dispute entries from a rolling time period preceding the data entry.

6. The method as recited in claim 5, wherein the rolling time period comprises three months preceding the data entry.

7. The method as recited in claim 5, wherein the duplicate classification model is retrained according to a predetermined schedule.

8. The method as recited in claim 7, wherein the predetermined schedule comprises once per week.

9. A system comprising:
   at least one processor in communication with at least one non-transitory computer readable medium having software instructions stored thereon, wherein, upon execution of the software instructions, the at least one processor is configured to:

receive a plurality of data entries associated with a user;
   wherein each data entry of the plurality of data entries comprises at least one attribute;
determine a plurality of pairs of candidate duplicate data entries based at least in part on:
   a proximity between each data entry of each pair of candidate duplicate data entries, and
   the at least one attribute between each candidate duplicate data entry of each pair of candidate duplicate data entries;
   wherein the proximity comprises a predetermined interval of time;
input each pair of candidate duplicate data entries of the plurality of pairs of candidate duplicate data entries into a duplicate classification model to automatically generate a duplicate classification indicative of at least one pair of duplicate data entries from the plurality of pairs of candidate duplicate data entries based at least in part on the at least one attribute of each candidate duplicate data entry;
   wherein the duplicate classification model comprises model parameters trained according to a plurality of historical data entries and a plurality of historical dispute entries disputing past data entries;
generate a duplicate graphical user interface (GUI) comprising an alert message and a one-click resolution interface element;
   wherein the alert message represents the duplicate classification of an incorrect duplicate data entry;
   wherein the one-click resolution interface element comprises a user selectable element that upon selection causes an electronic request to automatically remove at least one duplicate data entry of the at least one pair of duplicate data entries;
cause to display the duplicate GUI on a user computing device associated with the user of the at least one pair of duplicate data entries;
receive at least one indication that the user has selected the user selectable element; and
train the model parameters of the duplicate classification model based at least in part on:
   the duplicate classification of the at least one pair of duplicate data entries and
   the at least one indication that the user has selected the user selectable element.

10. The system as recited in claim 9, wherein the alert is communicated prior to a posting of the at least one duplicate data entry.

11. The system as recited in claim 9, wherein the duplicate classification comprises a binary classification for each candidate duplicate data entry of the plurality of candidate duplicate data entries.

12. The system as recited in claim 9, wherein the duplicate classification model comprises a random forest model.

13. The system as recited in claim 9, wherein the plurality of historical data entries comprises historical dispute entries from a rolling time period preceding the data entry.

14. The system as recited in claim 13, wherein the rolling time period comprises three months preceding the data entry.

15. The system as recited in claim 13, wherein the duplicate classification model is retrained according to a predetermined schedule.

16. The system as recited in claim 15, wherein the predetermined schedule comprises once per week.

* * * * *